United States Patent
Sprigg

(10) Patent No.: US 8,555,271 B2
(45) Date of Patent: Oct. 8, 2013

(54) METHOD, SOFTWARE AND APPARATUS FOR APPLICATION UPGRADE DURING EXECUTION

(75) Inventor: Stephen A. Sprigg, Poway, CA (US)

(73) Assignee: QUALCOMM Incorporated, San Diego, CA (US)

(*) Notice: Subject to any disclaimer, the term of this patent is extended or adjusted under 35 U.S.C. 154(b) by 1892 days.

(21) Appl. No.: 10/969,507

(22) Filed: Oct. 20, 2004

(65) Prior Publication Data

US 2005/0120346 A1 Jun. 2, 2005

Related U.S. Application Data

(60) Provisional application No. 60/515,802, filed on Oct. 29, 2003.

(51) Int. Cl.
*G06F 9/45* (2006.01)

(52) U.S. Cl.
USPC ............................ 717/169; 717/168; 717/174

(58) Field of Classification Search
USPC ................................................ 717/170, 169
See application file for complete search history.

(56) References Cited

U.S. PATENT DOCUMENTS

| | | | | |
|---|---|---|---|---|
| 6,009,274 A | * | 12/1999 | Fletcher et al. | 717/173 |
| 6,141,683 A | * | 10/2000 | Kraml et al. | 709/220 |
| 6,195,650 B1 | * | 2/2001 | Gaither et al. | 1/1 |
| 6,263,497 B1 | * | 7/2001 | Maeda et al. | 717/170 |
| 6,330,716 B1 | * | 12/2001 | Oberhauser | 717/171 |
| 6,381,615 B2 | * | 4/2002 | Gaither et al. | 707/705 |
| 6,457,122 B1 | | 9/2002 | Ramezani | |
| 6,609,186 B1 | * | 8/2003 | Veres et al. | 711/171 |
| 6,941,135 B2 | | 9/2005 | Minear et al. | |
| 6,971,002 B2 | * | 11/2005 | Austen et al. | 713/1 |
| 7,003,767 B2 | * | 2/2006 | Larkin | 717/172 |
| 7,062,764 B2 | * | 6/2006 | Cohen et al. | 717/171 |

(Continued)

FOREIGN PATENT DOCUMENTS

| | | |
|---|---|---|
| CA | 2357382 A1 | 3/2003 |
| CL | 2777-2004 | 9/2005 |

(Continued)

OTHER PUBLICATIONS

Supplementary European Search Report-EP04796872—Search Authority-Munich Patent Office-Feb. 1, 2008.

(Continued)

*Primary Examiner* — Wei Zhen
*Assistant Examiner* — Matthew Brophy
(74) *Attorney, Agent, or Firm* — James T. Hagler

(57) ABSTRACT

A system and method for optional upgrading of a software application on a wireless device during the execution of the software application. The system includes receiving a request to replace a resident executable application with a different version of the application. The system further includes detecting the active execution of the resident executable application. The system also includes receiving, via a network, the different version of the application. Also, the system includes storing the different version of the application in a temporary location in response to detecting the active execution of the resident executable application. In addition, the system includes terminating the active execution of the resident executable application. The system also includes overwriting the resident executable application with the different version of the application stored in the temporary location. Further, the system includes initiating active execution of the different version of the application.

28 Claims, 8 Drawing Sheets

(56) References Cited

U.S. PATENT DOCUMENTS

| | | | |
|---|---|---|---|
| 7,107,588 B2* | 9/2006 | Gentry | 717/176 |
| 7,269,668 B2* | 9/2007 | Redford et al. | 710/8 |
| 7,665,118 B2* | 2/2010 | Mann et al. | 726/1 |
| 7,784,044 B2* | 8/2010 | Buban et al. | 717/168 |
| 2002/0069263 A1 | 6/2002 | Sears et al. | |
| 2003/0032417 A1* | 2/2003 | Minear et al. | 455/419 |
| 2003/0046680 A1* | 3/2003 | Gentry | 717/176 |
| 2003/0066065 A1* | 4/2003 | Larkin | 717/177 |
| 2003/0121033 A1* | 6/2003 | Peev et al. | 717/175 |
| 2003/0233644 A1* | 12/2003 | Cohen et al. | 717/171 |
| 2004/0107416 A1* | 6/2004 | Buban et al. | 717/170 |
| 2004/0215755 A1* | 10/2004 | O'Neill | 709/223 |
| 2005/0028001 A1* | 2/2005 | Huang et al. | 713/200 |
| 2005/0055595 A1* | 3/2005 | Frazer et al. | 713/400 |

FOREIGN PATENT DOCUMENTS

| | | |
|---|---|---|
| JP | 2001296995 | 10/2001 |
| JP | 2002169739 | 6/2002 |
| JP | 2003122587 | 4/2003 |
| TW | 518513 | 1/2003 |
| TW | 556094 | 10/2003 |
| WO | 0060453 | 10/2000 |
| WO | 03025742 | 3/2003 |
| WO | WO 0325749 A1 | 3/2003 |

OTHER PUBLICATIONS

International Search Report and Written Opinion—PCT/US2004/036288, International Search Authority—European Patent Office—Dec. 5, 2006 (040068).

* cited by examiner

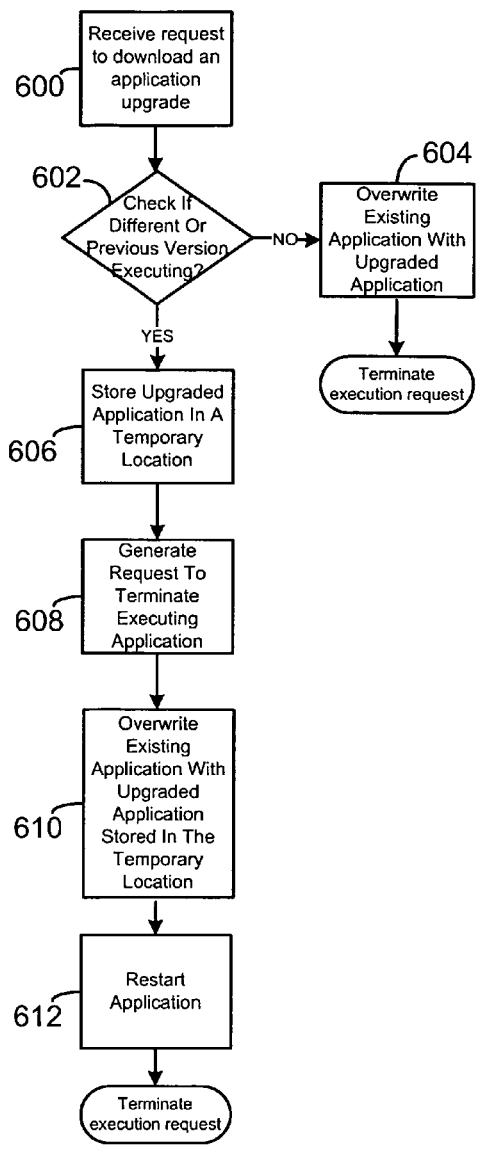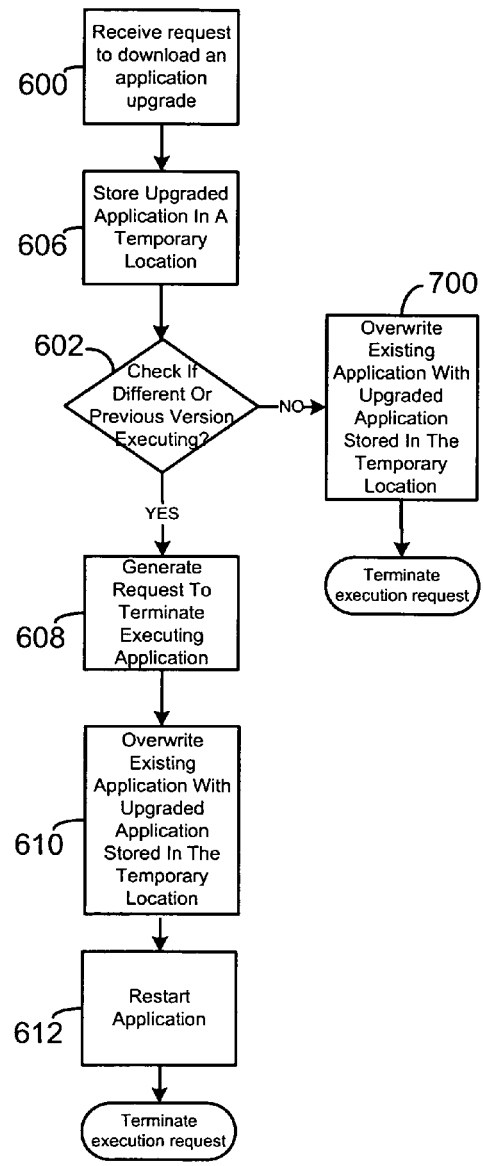
Fig. 6
Fig. 7

METHOD, SOFTWARE AND APPARATUS FOR APPLICATION UPGRADE DURING EXECUTION

CROSS-REFERENCE TO RELATED APPLICATIONS

This application claims priority to pending U.S. Provisional application No. 60/515,802, filed Oct. 29, 2003, incorporated herein by reference.

BACKGROUND OF THE INVENTION

1. Field of the Invention

The present invention generally relates to data networks and computer communications across the data networks. More particularly, the invention relates, in part, to the installation and deletion of software applications and their components on wireless devices in selective communication with one or more application download servers across a wireless data network. Also more particularly, the invention relates, in part, to the optional upgrading of a software application on a wireless device during the execution of the software application.

2. Description of the Related Art

Wireless devices, such as cellular telephones, communicate packets including voice and data over a wireless network. Cellular telephones themselves are being manufactured with increased computing capabilities and are becoming tantamount to personal computers and hand-held personal digital assistants ("PDAs"). These "smart" cellular telephones have installed application programming interfaces ("APIs") onto their local computer platform that allow software developers to create software applications (commonly referred to as "programs") that are fully executable on the cellular telephone. The API sits between the wireless device system software and the software application making the cellular telephone computing functionality available to the application without requiring the software developer to have the specific cellular telephone system source code.

The software applications can come pre-loaded at the time the wireless telephone is manufactured, or the user may later request that additional programs be downloaded over cellular telecommunication carrier networks, where the downloaded applications are executable on the wireless telephone. As a result, users of wireless telephones can customize their wireless telephones through the selective downloading of applications, such as games, printed media, stock updates, news, or any other type of information or application that is available for download through the wireless network. In order to manage the cellular telephone resources, the user of the wireless telephone purposefully deletes applications and data from the wireless telephone platform to clear storage space so that new applications can be loaded onto the cleared storage.

In contrast to the larger computer platforms of personal computers and PDAs, wireless devices have limited resources, such as storage and processing, to devote to non-essential applications. Typically, the telecommunication applications have priority of usage of the system resources, with other applications allocated resources as available. The wireless device thus only has a limited capacity for holding all files for applications, and the managing of resources is left up to the discretion of user of the telephone to delete applications to make room for new applications desired downloaded to the wireless device. The wireless device will not otherwise download an application that it does not have the resources to hold and execute.

In seeking to free resources on the wireless device, the user normally cannot remove certain components of a resident application without disabling the entire resident application. If the user sought to delete specific components, such action would controvert the intended freeing of resources as the disabled resident application cannot be restored without full reinstallation of the application. The useless undeleted application components still needlessly take up storage space even though the main application is unexecutable. This all-or-nothing deletion requirement for the resident software applications on the wireless device greatly limits the number of applications that can be resident on the wireless device and available to the user.

Accordingly it would be advantageous to provide a wireless device that can remove certain components of applications while maintaining important data for the application, such as licenses and user-specific data, to maximize the utilization of computer resources on the wireless device. Upon the wireless device requiring the deleted software components to again execute the application, the wireless device can obtain the software components through the wireless network. It is thus to the provision of such a system and method that can control the deletion and reloading of select software application components at the wireless device that the present invention is primarily directed.

SUMMARY OF THE INVENTION

Embodiments disclosed herein include systems and methods for upgrading of a software application on a wireless device, such as a cellular telephone, personal digital assistant, pager, or other computer platform, wherein the upgrade is optionally performed during the execution of the software application. At least one embodiment includes receiving a request to replace a resident executable application with a different version of the application. Such embodiment further includes detecting the active execution of the resident executable application. Such embodiment further includes receiving, via a network, the different version of the application. Such embodiment further includes storing the different version of the application in a temporary location in response to detecting the active execution of the resident executable application. Such embodiment further includes terminating the active execution of the resident executable application. Also, such embodiment further includes overwriting the resident executable application with the different version of the application stored in the temporary location; and such embodiment further includes initiating active execution of the different version of the application.

At least one embodiment includes logic configured to receive a request to replace a resident executable application with a different version of the application. Such embodiment further includes logic configured to detect the active execution of the resident executable application. Such embodiment further includes logic configured to receive, via a network, the different version of the application. Such embodiment further includes logic configured to store the different version of the application in a temporary location in response to detecting the active execution of the resident executable application. Such embodiment further includes logic configured to terminate the active execution of the resident executable application. Such embodiment further includes logic configured to overwrite the resident executable application with the different version of the application stored in the temporary location. Also, such embodiment further includes logic configured to initiate active execution of the different version of the application.

At least one embodiment includes code operable receive a request to replace a resident executable application with a different version of the application. Such embodiment further includes code operable to detect the active execution of the resident executable application. Such embodiment further includes code operable to receive, via a network, the different version of the application. Such embodiment further includes code operable to store the different version of the application in a temporary location in response to detecting the active execution of the resident executable application. Such embodiment further includes code operable to terminate the active execution of the resident executable application. Such embodiment further includes code operable to overwrite the resident executable application with the different version of the application stored in the temporary location. Also, such embodiment further includes code operable to initiate active execution of the different version of the application.

At least one embodiment includes means for receiving a request to replace a resident executable application with a different version of the application. Such embodiment includes means for detecting the active execution of the resident executable application. Such embodiment includes means for receiving, via a network, the different version of the application. Such embodiment includes means for storing the different version of the application in a temporary location in response to detecting the active execution of the resident executable application. Such embodiment includes means for terminating the active execution of the resident executable application. Such embodiment includes means for overwriting the resident executable application with the different version of the application stored in the temporary location. Also, such embodiment includes means for initiating active execution of the different version of the application.

At least one embodiment includes receiving a request to replace a resident executable application with a different version of the application. Such embodiment further includes receiving, via a network, the different version of the application. Such embodiment further includes storing the different version of the application in a temporary location in response to receiving the request to replace a resident executable application with a different version of the application. Such embodiment further includes detecting the active execution of the resident executable application. Such embodiment further includes terminating the active execution of the resident executable application. Such embodiment further includes overwriting the resident executable application with the different version of the application stored in the temporary location. Also, such embodiment further includes initiating active execution of the different version of the application.

At least one embodiment includes logic configured to receive a request to replace a resident executable application with a different version of the application. Such embodiment also includes logic configured to receive, via a network, the different version of the application. Such embodiment further includes logic configured to store the different version of the application in a temporary location in response to receiving the request to replace a resident executable application with a different version of the application. Such embodiment further includes logic configured to detect the active execution of the resident executable application. Such embodiment further includes logic configured to terminate the active execution of the resident executable application. Such embodiment further includes logic configured to overwrite the resident executable application with the different version of the application stored in the temporary location. Also, such embodiment further includes logic configured to initiate active execution of the different version of the application.

At least one embodiment includes code operable to receive a request to replace a resident executable application with a different version of the application. Such embodiment further including code operable to receive, via a network, the different version of the application. Such embodiment further including code operable to store the different version of the application in a temporary location in response to receiving the request to replace a resident executable application with a different version of the application. Such embodiment further including code operable to detect the active execution of the resident executable application. Such embodiment further including code operable to terminate the active execution of the resident executable application. Such embodiment further including code operable to overwrite the resident executable application with the different version of the application stored in the temporary location. Also, such embodiment further including code operable to initiate active execution of the different version of the application.

At least one embodiment includes means for receiving a request to replace a resident executable application with a different version of the application. Such embodiment further includes means for receiving, via a network, the different version of the application. Such embodiment further includes means for storing the different version of the application in a temporary location in response to receiving the request to replace a resident executable application with a different version of the application. Such embodiment further includes means for detecting the active execution of the resident executable application. Such embodiment further includes means for terminating the active execution of the resident executable application. Such embodiment further includes means for overwriting the resident executable application with the different version of the application stored in the temporary location. Also, such embodiment further includes means for initiating active execution of the different version of the application.

At least one embodiment includes receiving a request to replace a resident executable application with a different version of the application. Such embodiment further includes receiving, via a network, the different version of the application. Such embodiment further includes storing the different version of the application in an upgrade location in response to receiving the request to replace a resident executable application with a different version of the application. Such embodiment further includes detecting the active execution of the resident executable application in an active application location. Such embodiment further includes terminating the active execution of the resident executable application. Also, such embodiment further includes initiating execution of first application detected in a sequential search of the upgrade location and the active application location.

At least one embodiment includes logic configured to receive a request to replace a resident executable application with a different version of the application. Such embodiment further includes logic configured to receive, via a network, the different version of the application. Such embodiment further includes logic configured to store the different version of the application in an upgrade location in response to receiving the request to replace a resident executable application with a different version of the application. Such embodiment further includes logic configured to detect the active execution of the resident executable application in an active application location. Such embodiment further includes logic configured to terminate the active execution of the resident executable application. Also, such embodiment further includes logic configured to initiate execution of first application detected in a sequential search of the upgrade location and the active application location.

At least one embodiment includes code operable to receive a request to replace a resident executable application with a different version of the application. Such embodiment includes code operable to receive, via a network, the different version of the application. Such embodiment includes code operable to store the different version of the application in an upgrade location in response to receiving the request to replace a resident executable application with a different version of the application. Such embodiment includes code code operable to detect the active execution of the resident executable application in an active application location. Such embodiment includes code operable to terminate the active execution of the resident executable application. Also, such embodiment includes code operable to initiate execution of first application detected in a sequential search of the upgrade location and the active application location.

At least one embodiment includes means, for receiving a request to replace a resident executable application with a different version of the application. Such embodiment also includes means for receiving, via a network, the different version of the application. Such embodiment also includes means for storing the different version of the application in an upgrade location in response to receiving the request to replace a resident executable application with a different version of the application. Such embodiment also includes means for detecting the active execution of the resident executable application in an active application location. Such embodiment also includes means for terminating the active execution of the resident executable application. Also, such embodiment includes means for initiating execution of first application detected in a sequential search of the upgrade location and the active application location.

Other objects, advantages, and features of the present invention will become apparent after review of the hereinafter set forth Brief Description of the Drawings, Detailed Description of the Invention, and the claims.

BRIEF DESCRIPTION OF THE DRAWINGS

FIG. 6 is a flowchart illustrating one embodiment of a system including the replacement of a resident executable application with a different version of the application.

FIG. 7 is a flowchart illustrating one embodiment of a system including the replacement of a resident executable application with a different version of the application.

DETAILED DESCRIPTION OF THE INVENTION

Figure 1:
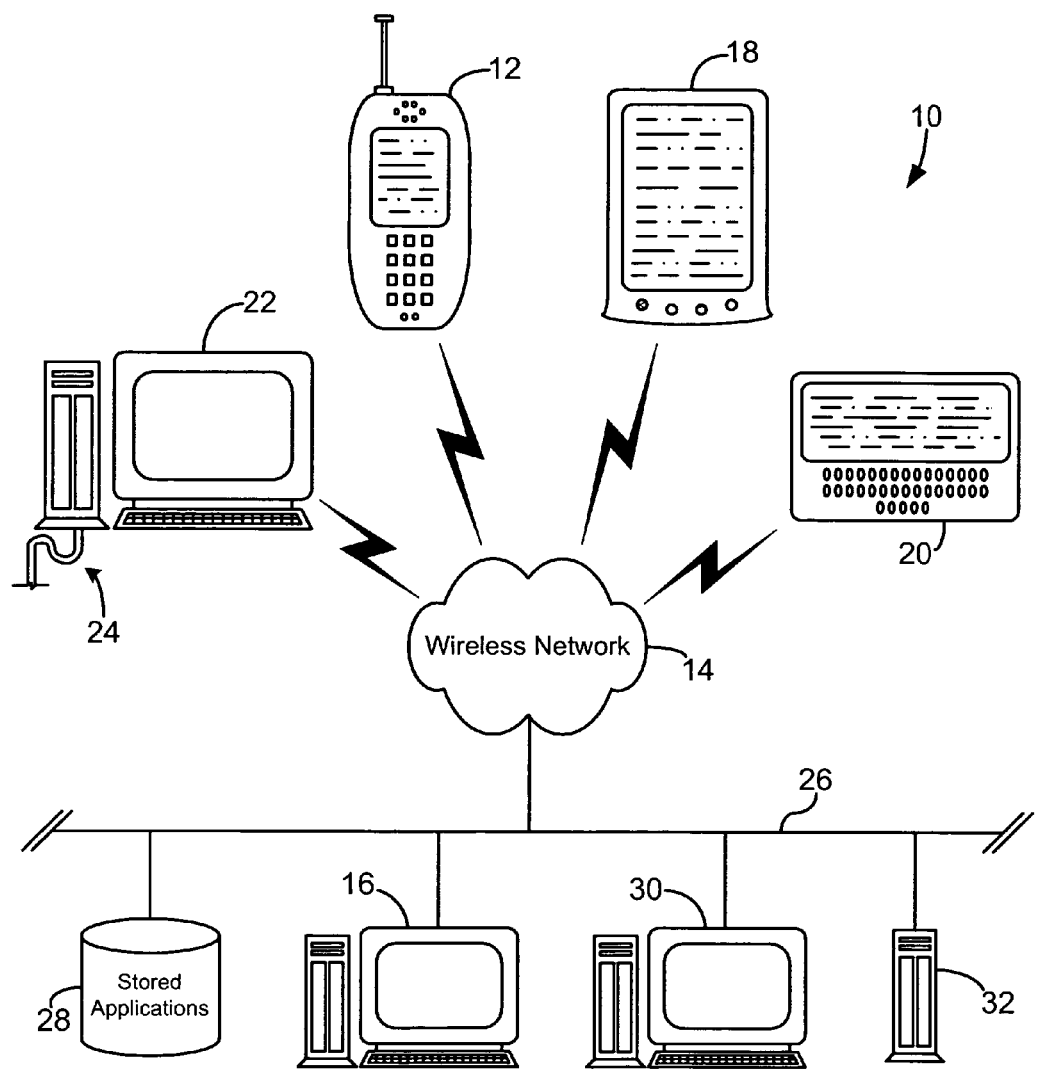
FIG. 1 is a representative diagram of the present invention system of managing software applications on wireless devices in selective communication with one or more application download servers over a wireless network.

With reference to FIG. 1, there is shown the present inventive system 10 for the deletion and reloading of software application components on a wireless device, such as cellular telephone 12, in communication across a wireless network 14 with at least one application download server 16 that selectively transmits software applications and components to wireless devices across a wireless communication portal or other data access to the wireless network 14. As shown here, the wireless device can be a cellular telephone 12, a personal digital assistant 18, a pager 20, which is shown here as a two-way text pager, or even a separate computer platform 22 that has a wireless communication portal, and may otherwise have a wired connection 24 to a network or the Internet. The inventive system can thus be performed on any form of remote module including a wireless communication portal, including without limitation, wireless modems, PCMCIA cards, access terminals, personal computers, access terminals, telephones without a display or keypad, or any combination or sub-combination thereof.

The application download server 16 is shown here on a network 26 with other computer elements in communication with the wireless network 14. There is a second server 30 and a stand-alone server 32, and each server can provide separate services and processes to the wireless devices 12,18,20,22 across the wireless network 14. There is preferably also at least one stored application database 28 that holds the applications that are downloadable by the wireless devices 12,18, 20,22.

Figure 2:
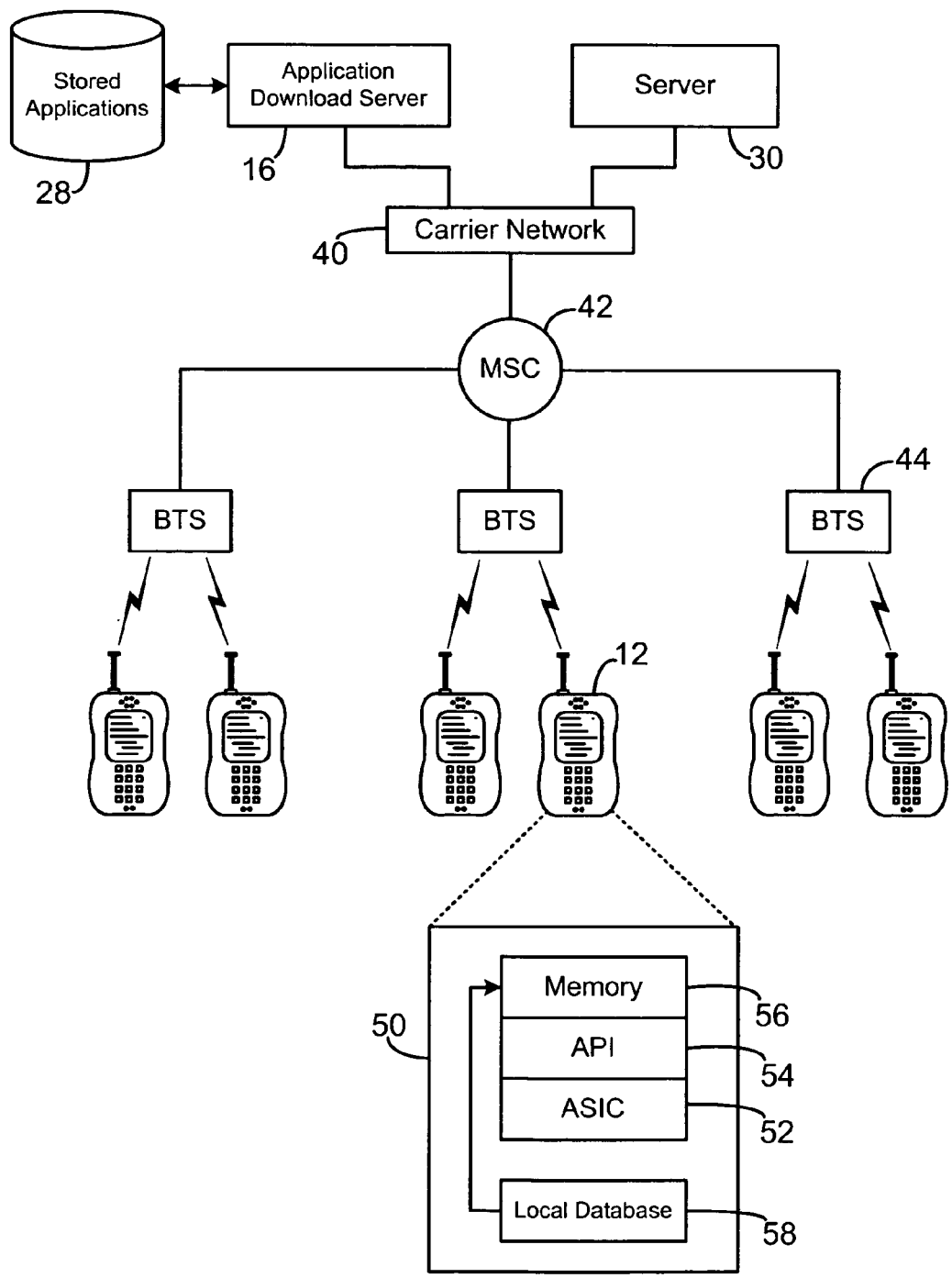
FIG. 2 is a block diagram of the hardware components of an exemplary wireless network providing communication between different wireless devices and an application download server and database.

In FIG. 2, a block diagram is shown that more fully illustrates the components of the wireless network 14 and interrelation of the elements of the present invention. The wireless network 14 is merely exemplary and can include any system whereby remote modules, such as wireless devices 12,18,20, 22 communicate over-the-air between and among each other and/or between and among components of a wireless network 14, including, without limitation, wireless network carriers and/or servers. The application download server 16 and the stored application database 28, along any other servers such as server 30 which are needed to provide cellular telecommunication services, communicate with a carrier network 40, through a data link, such as the Internet, a secure LAN, WAN, or other network. The carrier network 40 controls messages (sent as data packets) sent to a messaging service controller ("MSC") 42. The carrier network 40 communicates with the MSC 42 by a network, the Internet and/or POTS ("plain ordinary telephone system"). Typically, the network or Internet connection between the carrier network 40 and the MSC 42 transfers data, and the POTS transfers voice information. The MSC 42 is connected to multiple base stations ("BTS") 44. In a similar manner to the carrier network, the MSC 42 is typically connected to the BTS 44 by both the network and/or Internet for data transfer and POTS for voice information. The BTS 44 ultimately broadcasts messages wirelessly to the wireless devices, such as cellular telephone 12, by short messaging service ("SMS"), or other over-the-air methods known in the art.

The wireless device, such as cellular telephone 12, has a computer platform 50 that can receive and execute software applications transmitted from the application download server 16. The computer platform 50 includes an application-specific integrated circuit ("ASIC" 52), or other processor, microprocessor, logic circuit, or other data processing device. The ASIC 52 is installed at the time of manufacture of the wireless device and is not normally upgradeable. The ASIC 52 or other processor executes the application programming interface ("API") layer that interfaces with any resident programs in the memory 56 of the wireless device. The memory can be comprised of read-only or random-access memory (RAM and ROM), EPROM, flash cards, or any memory common to computer platforms. The computer platform 50 also includes a local database 58 that can hold applications not actively used in memory 56. The local database 58 is typically a flash memory cell, but can be any secondary storage device as known in the art, such as magnetic media, EPROM, optical media, tape, or soft or hard disk.

The wireless device, such as cellular telephone 12, accordingly downloads one or more software applications, such as games, news, stock monitors, and the like, and holds the application on the local database 58 when not in use, and uploads stored resident applications on the local database 58 to memory 56 for execution on the API 54 when so desired by the user. However, there are significant cost and size constraints on the wireless device that limit the installed storage capability available in the local database 58 and memory 56, so a limited amount of resident software applications can be held on the wireless device. The present inventive system and method manages this limitation of storage capacity through the selective deletion and reloading of individual software application components, as is further described herein.

Figure 3:
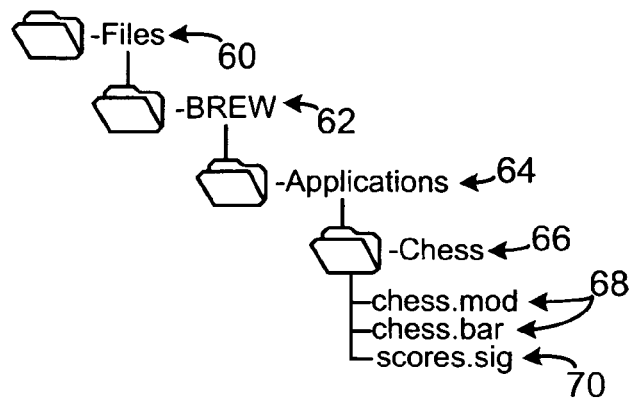
FIG. 3 is a file table resident on the wireless device platform specifically illustrating an application with its constituent components.

With reference to FIG. 3, there is shown an illustrative file structure, or data management structure, held in the API 54. The top-level domain is "Files" 60 that contains all of the discrete software files on the computer platform 50. The file structure of FIG. 3 is merely illustrative and may not appear in this form on the computer platform 50, and may even be present purely in machine code on the wireless device 12,18, 20,22 with no discernable file structure. In the Files 60 is the API, which here is shown as binary runtime environment for windows ("BREW") 62, which is the API used by QUAL-COMM® to interact with software applications on the wireless device computer platform 50. The BREW 62 files include application files 64, and one file is game of chess 66 that has been downloaded from the application download server 16 and is now resident on the local database 58 of the computer platform 50 of the wireless device. For purposes of illustration, the chess 66 application is a resident software application of the wireless device.

The chess 66 application includes several software components 68, such as the files chess.mod and chess.bar. The application components 68 are necessary modules to execute the chess application on the computer platform 50. Chess 66 also includes specific application-associated data, shown here as a scores.sig 70, which are the stored scores for the user playing games of chess on the computer platform 50. There also can be a license included as a hidden file in the chess 66 application. Thus, the application components 68 that allow execution of the game of chess are easily duplicated with a copy transmitted from the application download server 16, while the associated-application data, such as the scores 70 and the license will be lost if their files or modules are deleted.

The present invention therefore utilizes the ability to obtain another copy of the non-essential application components from the application download server 16 while maintaining the non-retrievable application-associated data, such as a license, or user specific data, such as personal information and addresses, or even purely entertainment-related data such as the previous scores 70 for chess games.

When the user desires to download another, software application to the computer platform 50 and there are insufficient resources, especially in terms of storage on the local database 58, the BREW API 62, or other space-managing components, can trigger a prompt to the user to ask if the application components for chess can be removed so that the requested downloaded application can be placed on the computer platform 50. Otherwise, the BREW API 62 can determine which components to delete and automatic manage the system resources. While the chess.mod and chess.bar files are deleted from the chess 66 file, the chess game will not be executable on the computer platform 50. Through the separation of essential and non-essential files on the computer platform 50, the wireless device can selectively delete one or more of the application components 68 of the one or more resident software applications without loss of the application-associated data, such as the scores file 70.

When the application which has had one or more application components deleted, such as the chess game 66 with the chess.mod and the chess.bar application components 68 deleted and the user desires to again use that application, the wireless device will selectively prompts the application download server 16 across the wireless network 14 for transmission of one or more application components 68. Once the wireless device receives the application components 68, the wireless device installs the transmitted one or more application components 68 back onto the computer platform 50 such that the resident application, or here chess 66, is again executable. It should be noted that all of the application components 68 do not have to be removed, and can be deleted based upon size of the application or other criteria. Further, the files containing application-associated data, such as scores.sig 70, can also contain application components required to execute the application and are not necessarily pure data-containers.

Figure 4:
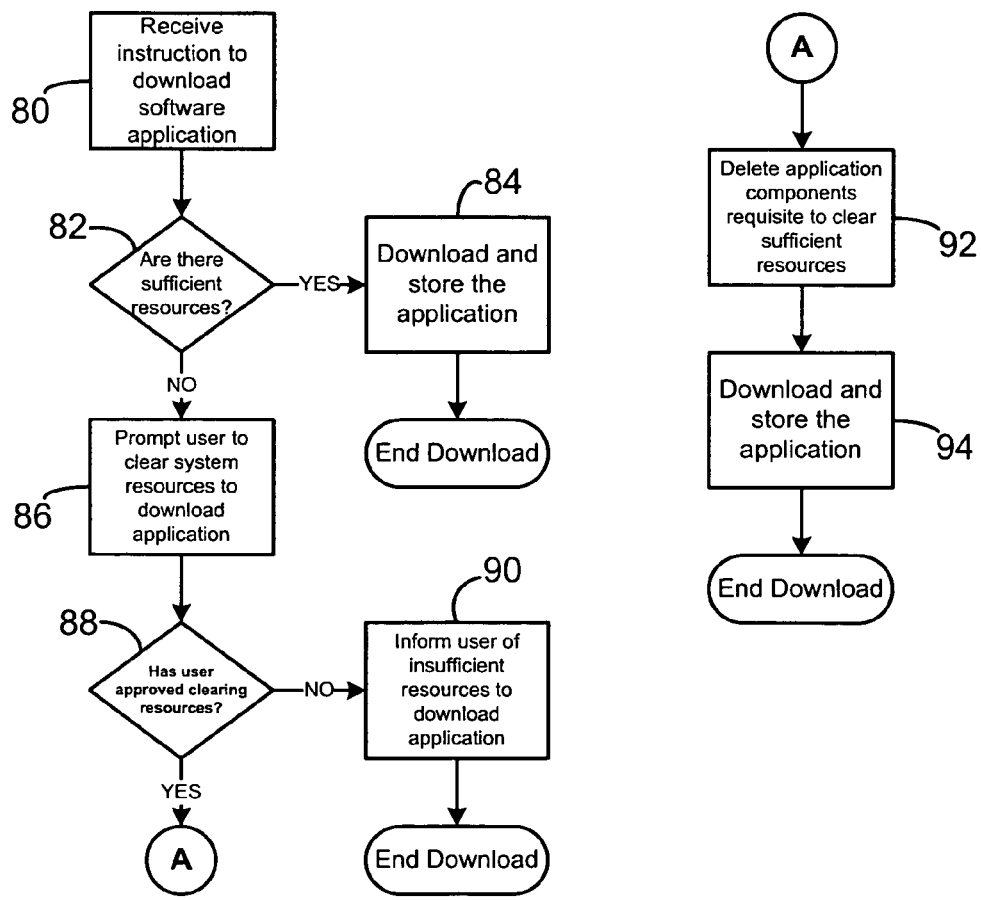
FIG. 4 is a flowchart illustrating the selective deletion of application components on the wireless device.
Figure 5:
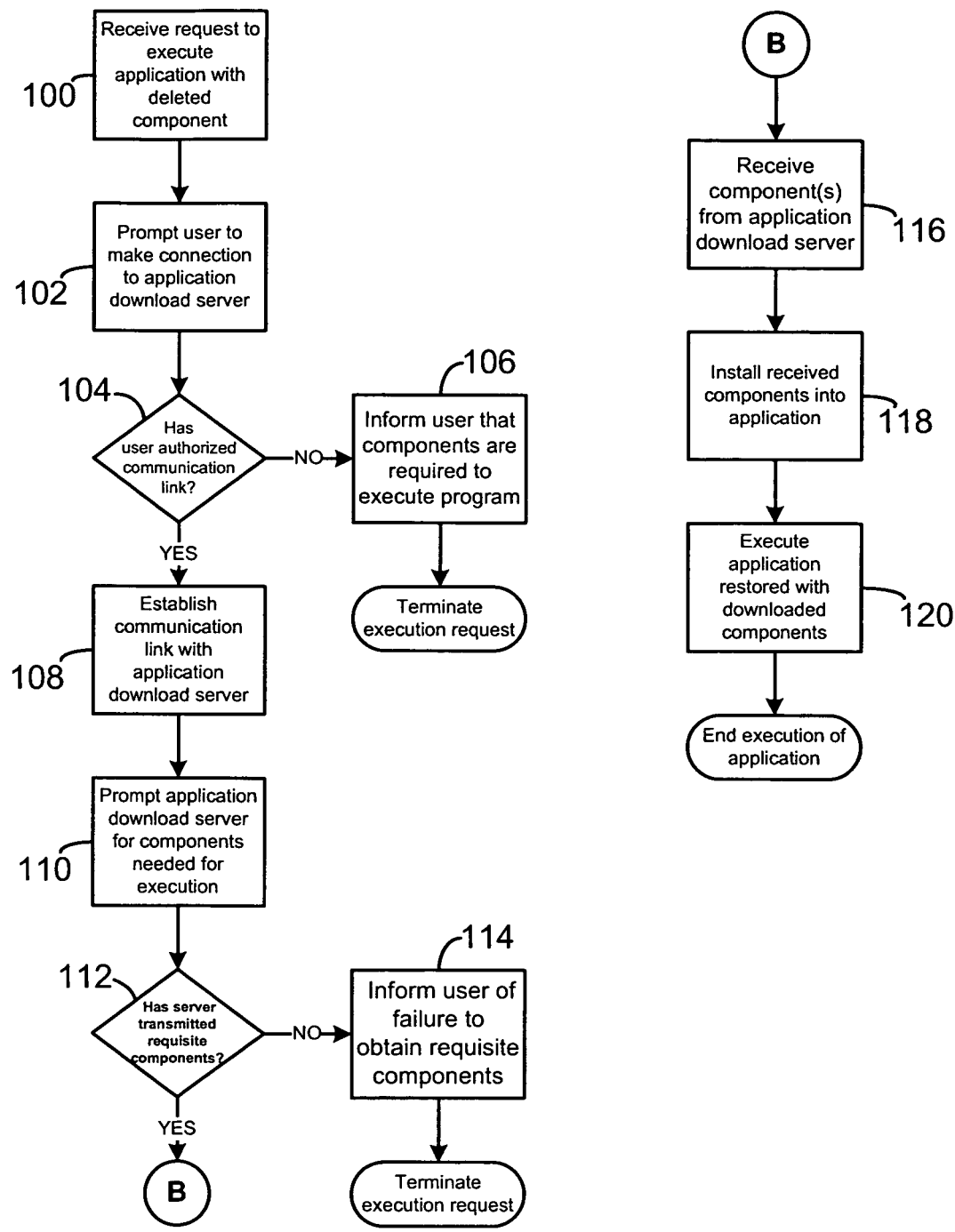
FIG. 5 is a flowchart illustrating the retrieval of the wireless device of application components from the application download server to restore an application on the wireless device such that the application is again executable.

FIGS. 4 and 5 are flowcharts illustrating the inventive method for managing the loading and removal of application components 68 of one or more software applications resident on the computer platform 50 of a wireless device 12,18,20,22. As shown in FIG. 4, the computer platform 50 receives the instruction to download a software application, shown at step 80, and then a decision is made on the ASIC 52 or other processor of the wireless device as to whether there are sufficient resources available to download the application, as shown at decision 82. If there are sufficient resources available, then the application is downloaded and stored, as shown at step 84, and the download process is terminated. If there are insufficient resources at decision 82, then the user is prompted to clear system resources in order to download the application, as shown at step 86, which entail the deleting of certain application components. A decision is then made as to whether the user approves of clearing resources, as shown at decision 88, and if not, the user is informed of the insufficient resources available for the download, as shown at step 90, and the download process is terminated. If the user approves of clearing resources at decision 88, then one or more application components, such as components 68, are selectively deleted to clear the requisite resources, and such deletion occurs without significant loss of the application-associated data, such as the scores.sig file 70 or any license to use the application. Then the application is downloaded and stored on the computer platform 50, as shown at step 94, and the down load process is terminated.

The process to reinstall the deleted components is shown in FIG. 5 when a request to execute the application with one or more deleted components 68 is received, as shown at step 100. An example of this would be the user seeking to play the chess game once again. The user is then preferably prompted to make a communication link to the application download server 16, as shown by step 102. However, the wireless device at receipt of the execution request can alternately automatically establish the communication link. If a request to execute the application is requested of the user, then a decision is made as to whether the user has authorized the link, as shown at decision 104. If the user declines establishing the link, the user is informed that the needed application components must be downloaded in order to execute the request application, as shown at step 106, and then the execution request is terminated. If the user authorizes the communication link at decision 104, then a communication link is establish with the application download server 16, as shown at step 108.

Once the communication link is established with the application download server 16, the application download server 16 is prompted by the wireless device to transmit one or more application components that are needed by the wireless device to execute the requested application, as shown at step 110. It is then determined if the server transmitted requisite application components, as shown at decision 112, and if not, the user is informed of the failure to obtain the requisite components, as shown at step 114, and the execution request is terminated. Otherwise, if the server has transmitted the requisite components at decision 112, the wireless device receives the components form the application download server, as shown at step 116, and installs the received components into the application such that the application is executable, as shown at step 118. The application is then executed on the wireless device until terminated, as shown at step 120.

If the reloading of the deleted application components, such as application components 68, were automatic, the process of FIG. 5 would go right from the receipt of the request to execute the application at step 100 to prompting the application download server 16 at step 110. The wireless device would only inform the user if the application failed to download the components, as shown at step 114.

The step of establishing a communication link is typically establishing a communication link through a digital or analog cellular telecommunication network as shown in FIG. 2, but other wireless networks such as a wireless LAN, or a microwave or infrared network can alternately be used. Further, establishing a communication link can occur automatically upon the wireless device 12,18,20,22 intending to execute a resident software application for which one or more associated components have been deleted, i.e. the wireless device bridges a communication through the wireless network 14 to the application download server 16. Otherwise, the step of establishing a communication link can occur upon the specific prompt of user of the wireless device 12,18,20,22 to bridge a communication link the application download server 16 to transmit over the wireless network 14 one or more application components for a resident software application for which one or more associated components have been deleted. If the user of the wireless device will be billed for the communication link, such as a cellular phone call, in order to have the new application components transmitted to the wireless device, then the user should be prompted prior to deletion of the component(s) to authorize the communication link that will be necessarily to reload the components. The user can again be prompted when the communication link is needed to retrieve the components of the application to render the application executable. However, if the wireless device is fully automated and the communication link does not necessitate a charge to the user, then no prompt needs to be made to the user, and the reloading of the component(s) is transparent, unless a problem is encountered and an error message generated, such as at step 114.

Automatic Application Upgrade During Execution.

In one embodiment, as shown in FIG. 6, an application or extension downloaded to the wireless device 12, 18, 20, 22 maybe downloaded to a wireless device 12, 18, 20, 22 while a previous or different version of the application or extension is currently executing on the wireless device 12, 18, 20, 22. The request to upgrade or download the application or extension may be made by the wireless device 12, 18, 20, 22, either by the user of the device or processes running on the wireless device 12, 18, 20, 22, or by a server 16, 30, 32. Note that an "upgrade" does not necessarily include a later version, but may refer to a different version. For example, it may be preferable to revert to an older version of an application, in such a case, the "upgrade" includes downloading a previous version of the application to replace the existing but later version.

(Hereinafter, only "application" will be used, however it will be understood that this description also applies to extensions. Extensions include those programs, components or services that are used by data or instructions to assist in the execution. For example, an extension may include the Java Virtual Machine installed on in the BREW environment on a wireless device that is used to execute java programs, or an MPEG player installed and used in connection with MPEG files). Furthermore, applications include not only any executable type of software but may include scripts or content data.

The embodiment process includes a step 600 in which a request made to download an application upgrade to a wireless device 12, 18, 20, 22. The wireless device 12, 18, 20, 22 may have a different or previous version of the application executing on the handset. In step 602, a check is made to determine if a different or previous version of the application requested is executing on the wireless device 12, 18, 20 22. If it is not, then, in step 604, the application may be upgraded with the newly requested application by overwriting the existing application with the newly requested application in the file location where the existing (i.e., previous or different) application is located on the device.

However, if, in step 602, the check determines that the application is executing, then the process continues, in step 606, where the upgraded application is stored in a temporary location. This temporary location may be on the device, however it can be stored on a peripheral device or somewhere else across the network where the device can access it.

In step 608, the executing application is notified that it needs to terminate. And either the application or secondary process initiates the termination of the executing application. Following the termination of the application, in step 610, the upgraded application is then transferred over to the file location of the existing application. Note that the location that the upgraded application is copied to is whatever location is anticipated by the system to execute the application. For example, in one embodiment, if the system anticipates looking in an upgraded location to execute the upgraded application and if it doesn't exist then the system looks to another location to execute the existing application, then the process will copy the upgraded application to the upgraded location and not overwrite the existing application(s).

After the upgrade application is transferred from the temporary location to the correct location (whether that is overwriting the existing application or some other expected location as described above), then the application, in step 612, is restarted. Note this application may restarted automatically. Also note that the device does not need to be reset, run through a power cycle, rebooted nor perform any other resetting-type of function for an existing and an executing application to be upgraded.

In another embodiment of the application upgrade, and as shown in FIG. 7, the requested application, in step 606 and prior to step 602, is downloaded to the device to a temporary location. After the download, then the device is checked, in step 602, to determine whether the previous or different application version is executing on the device. If it is, then, in step 608, the execution of the existing application is terminated, the upgraded application, in step 610, is copied from the temporary storage location to the correct storage location (e.g., it may overwrite the existing application), and then the upgraded application is executed in step 612. As stated above, this execution may be performed automatically.

If the existing application is not executing as determined in step 602, then, in step 700, the upgraded application is transferred over to correct location, e.g., overwriting the existing application. In this instance, because the application is not executing, there is no need to terminate its execution prior to transferring the upgraded application to the correct location.

Figure 8:
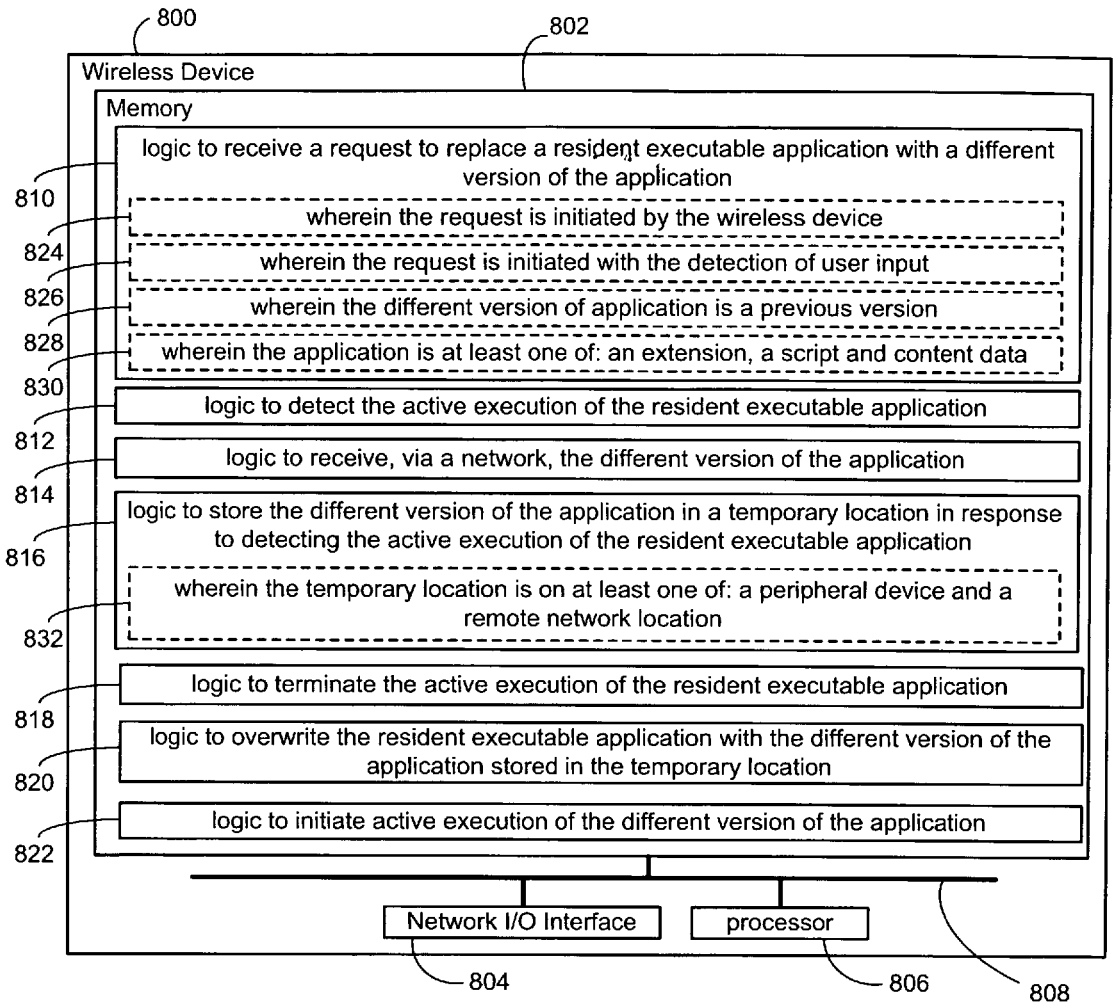
FIG. 8 is a block diagram of one embodiment of a wireless device as used in a system for replacing a resident executable application with a different version of the application.

FIG. 8 shows one embodiment of a wireless device implementing the method as described in FIG. 6. As shown, a wireless device 800 contains a memory 802, a network interface 804, a processor 806 and a bus 808. Although the memory 802 is shown as RAM memory, other embodiments include such memory 802 as all known types of memory that are known to provide for the storing of configured logic. In addition, although memory 802 is shown as one contiguous unit of one type of memory, other embodiments use multiple locations and multiple types of memory as memory 802. The network I/O interface 804 provides input and output to devices coupled to the network via the bus 808. The processor 806 operates on instructions and data provided via the bus 808. In at least one embodiment processor 906 is part of ASIC 52.

Located in memory 802 is logic 810 to receive a request to replace a resident executable application with a different version of the application, logic 812 to detect the active execution of the resident executable application, logic 814 to receive, via a network, the different version of the application, logic 816 to store the different version of the application in a temporary location in response to detecting the active execution of the resident executable application, logic 818 to terminate the active execution of the resident executable application, logic 820 to overwrite the resident executable application with the different version of the application stored in the temporary location, and logic 822 to initiate active execution of the different version of the application. In one or more different embodiments the logic 810 to receive a request to replace a resident executable application with a different version of the application is further modified such that wherein the request is initiated by the wireless device (824), wherein the request is initiated with the detection of user input (826), wherein the different version of application is a previous version (828), and/or wherein the application is at least one of: an extension, a script and content data (830). Also, in one embodiment the logic 816 to store the different version of the application in a temporary location in response to detecting the active execution of the resident executable application is further modified wherein the temporary location is on at least one of: a peripheral device and a remote network location (832).

Figure 9:
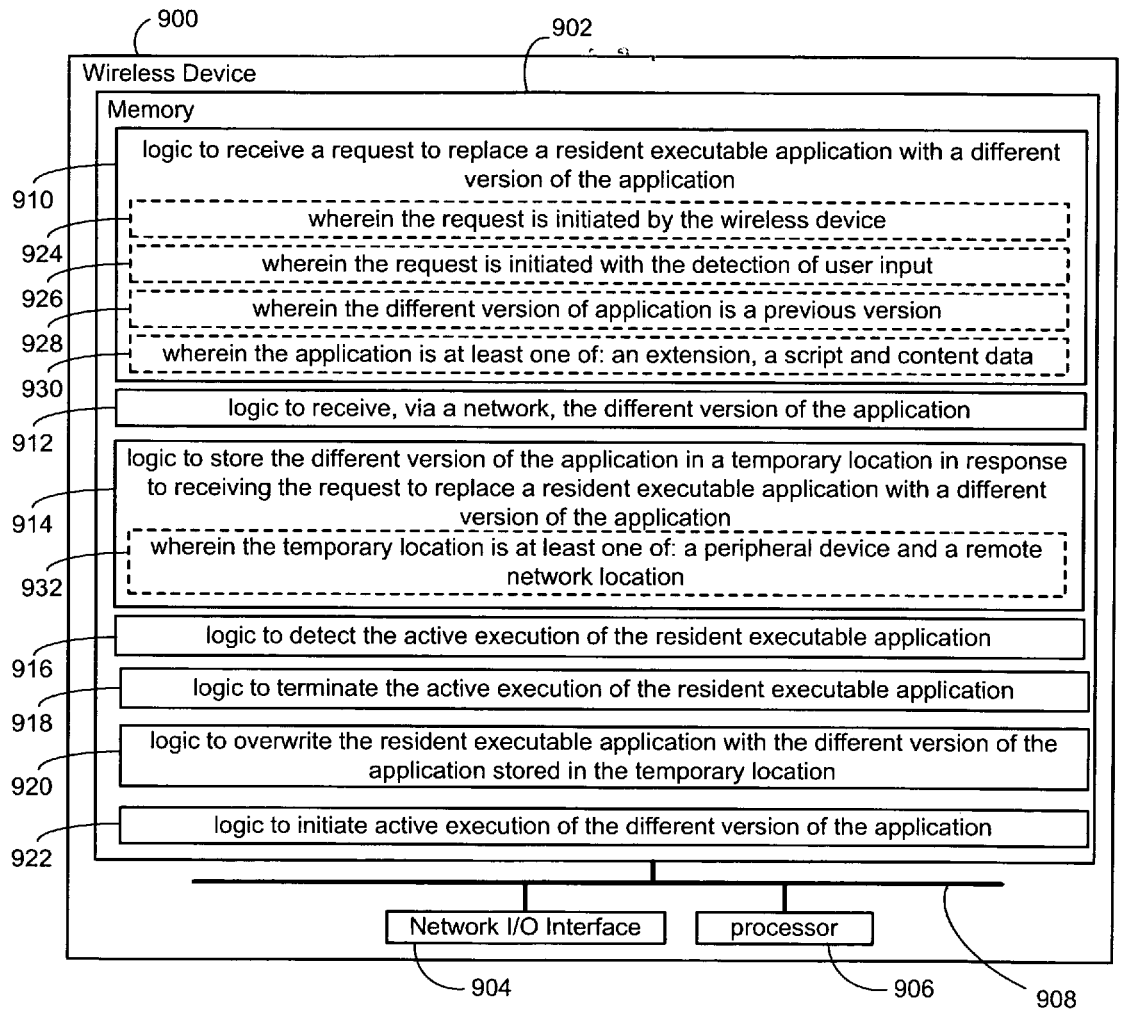
FIG. 9 is a block diagram of one embodiment of a wireless device as used in a system for replacing a resident executable application with a different version of the application.

FIG. 9 shows one embodiment of a wireless device implementing the method as described in FIG. 7. As shown, a wireless device 900 contains a memory 902, a network interface 904, a processor 906 and a bus 908. Although the memory 902 is shown as RAM memory, other embodiments include such memory 902 as all known types of memory that are known to provide for the storing of configured logic. In addition, although memory 802 is shown as one contiguous unit of one type of memory, other embodiments use multiple locations and multiple types of memory as memory 902. The network I/O interface 904 provides input and output to devices coupled to the network via the bus 908. The processor 906 operates on instructions and data provided via the bus 908. In at least one embodiment processor 906 is part of ASIC 52.

Located in memory 902 is logic 910 to receive a request to replace a resident executable application with a different version of the application, logic 912 to receive, via a network, the different version of the application, logic 914 to store the different version of the application in a temporary location in response to receiving the request to replace a resident executable application with a different version of the application, logic 916 to detect the active execution of the resident executable application, logic 918 to terminate the active execution of the resident executable application, logic 920 to overwrite the resident executable application with the different version of the application stored in the temporary location, and logic 922 to initiate active execution of the different version of the application. In one or more different embodiments the logic 910 to receive a request to replace a resident executable application with a different version of the application is further modified such that wherein the request is initiated by the wireless device (924), wherein the request is initiated with the detection of user input (926), wherein the different version of application is a previous version (928), and/or wherein the application is at least one of: an extension, a script and content data (930). Also, in one embodiment the logic 914 to store the different version of the application in a temporary location in response to detecting the active execution of the resident executable application is further modified wherein the temporary location is on at least one of: a peripheral device and a remote network location (932).

Figure 10:
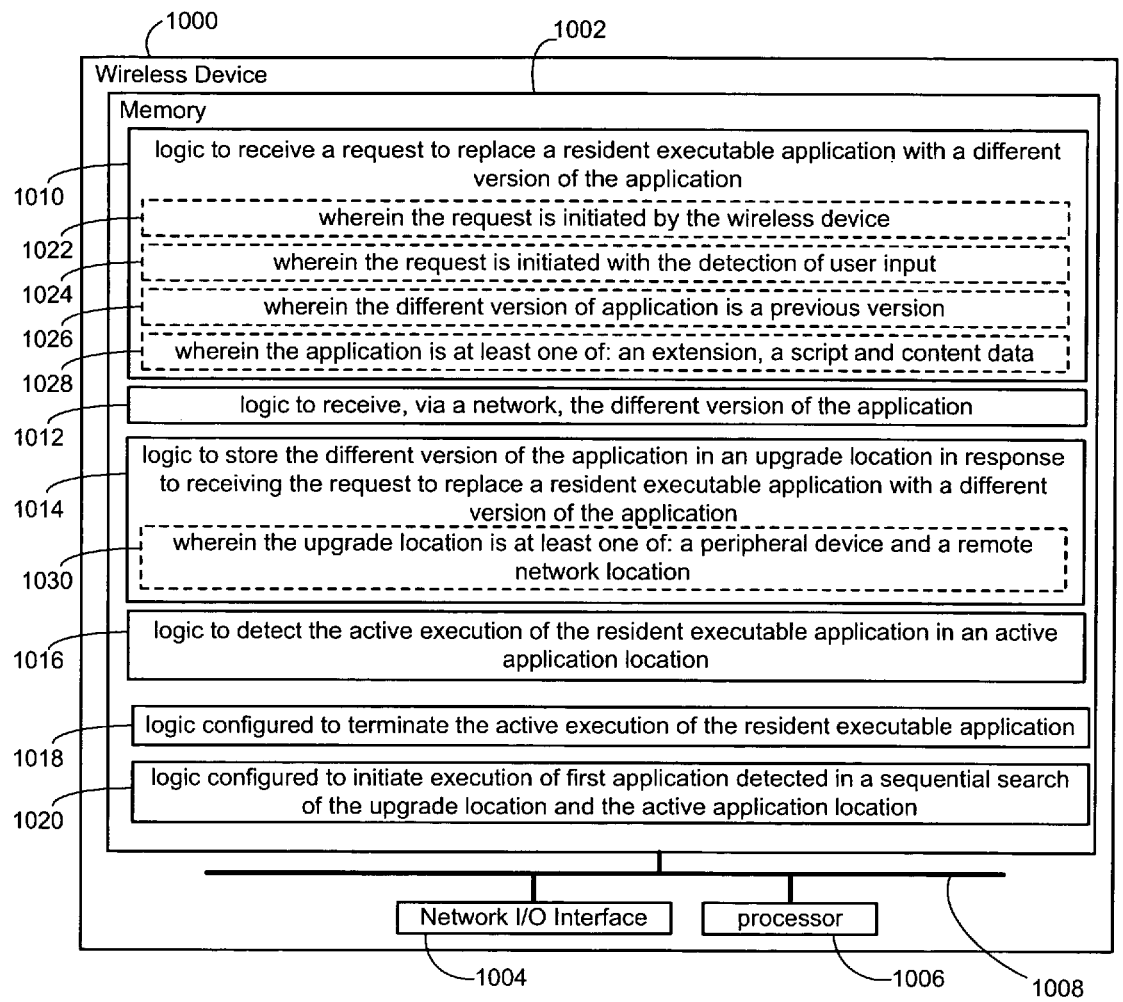
FIG. 10 is a block diagram of one embodiment of a wireless device as used in a system for replacing a resident executable application with a different version of the application.

FIG. 10 shows one embodiment of a wireless device implementing a version of the automatic application upgrade process sometimes described as including a sequential search of executing locations in the process of initiating execution of a preferred application. As shown, a wireless device 1000 contains a memory 1002, a network interface 1004, a processor 1006 and a bus 1008. Although the memory 1002 is shown as RAM memory, other embodiments include such memory 1002 as all known types of memory that are known to provide for the storing of configured logic. In addition, although memory 1002 is shown as one contiguous unit of one type of memory, other embodiments use multiple locations and multiple types of memory as memory 1002. The network I/O interface 1004 provides input and output to devices coupled to the network via the bus 1008. The processor 1006 operates on instructions and data provided via the bus 1008. In at least one embodiment processor 1006 is part of ASIC 52.

Located in memory 1002 is logic 1010 to receive a request to replace a resident executable application with a different version of the application, logic 1012 to receive, via a network, the different version of the application, logic 1014 to store the different version of the application in a temporary location in response to receiving the request to replace a resident executable application with a different version of the application, logic 1016 to detect the active execution of the resident executable application in an active application location, logic 1018 to terminate the active execution of the resident executable application, logic 1020 configured to initiate execution of first application detected in a sequential search of the upgrade location and the active application location. In one or more different embodiments the logic 1010 to receive a request to replace a resident executable application with a different version of the application is further modified such that wherein the request is initiated by the wireless device (1022), wherein the request is initiated with the detection of user input (1024), wherein the different version of application is a previous version (1026), and/or wherein the application is at least one of: an extension, a script and content data (1028). Also, in one embodiment the logic 1014 to store the different version of the application in an upgrade location in response to receiving the request to replace a resident executable application with a different version of the application is further modified wherein the upgrade location is on at least one of: a peripheral device and a remote network location (1030).

In view of the inventive method, the present invention includes a program resident in a computer readable medium, where the program directs a wireless device having a computer platform to perform the inventive steps of the method. The computer readable medium can be the memory 56 of the computer platform 50 of the cellular telephone 12, or other wireless device, or can be in a local database, such as local database 58 of the cellular telephone 12. Further, the computer readable medium can be in a secondary storage media that is loadable onto a wireless device computer platform, such as a magnetic disk or tape, optical disk, hard disk, flash memory, or other storage media as is known in the art. In the context of FIGS. 4 and 5, the present invention methods may be implemented, for example, by operating portion(s) of the wireless network 14 to execute a sequence of machine-readable instructions. These instructions may reside in various types of signal-bearing media. This signal-bearing media may comprise, for example, RAM (not shown) accessible by, or residing within, the components of the wireless network 14. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable data storage media including transmission media such as digital and analog.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A method for replacing a resident executable application on a wireless device with a different version of the resident executable application, comprising:

receiving a request to replace the resident executable application with the different version of the application, wherein the request is initiated in response to a user input and wherein the request to replace the resident executable includes replacing non-essential application components while maintaining non-retrievable application-associated data;

detecting the active execution of the resident executable application on the wireless device;

receiving, via a network, the different version of the resident executable application;

storing the different version of the resident executable application in a temporary location in response to detecting the active execution of the resident executable application;

terminating only the active execution of the resident executable application;

selectively deleting one or more application components if it is determined that there are not sufficient resources on a the wireless device;

overwriting the resident executable application with the different version of the application stored in the temporary location;

and initiating active execution of the different version of the resident executable application without rebooting the wireless device, wherein activation of the different version of the resident executable application includes using of the maintained non-retrievable application-associated data.

2. The method of claim 1, wherein the different version of resident executable application is a previous version.

3. The method of claim 1, wherein the resident executable application is at least one of: an extension, a script and content data.

4. The method of claim 1, wherein the temporary location is on at least one of: a peripheral device and a remote network location.

5. A wireless device containing a resident executable application, comprising:

a processor which receives a request to replace a resident executable application with a different version of the application wherein the request is initiated in response to a user input and, wherein the request to replace the resident executable includes replacing non-essential application components while maintaining non-retrievable application-associated data; and further wherein the processor detects the active execution of the resident executable application on the wireless device;

memory which receives, via a network, the different version of the resident executable application and stores the different version of the resident executable application in a temporary location in response to detecting the active execution of the resident executable application;

wherein the processor terminates only the active execution of the resident executable application, selectively deletes one or more application components if it is determined that there are not sufficient resources on a the wireless device, and overwrites the resident executable application with the different version of the application stored in the temporary location and initiates active execution of the different version of the resident executable application without rebooting the wireless device wherein activation of the different version of the resident executable application includes using of the maintained non-retrievable application-associated data.

6. The wireless device of claim 5, wherein the different version of resident executable application is a previous version.

7. The wireless device of claim 5, wherein the resident executable application is at least one of: an extension, a script and content data.

8. The wireless device of claim 5, wherein the temporary location is on at least one of: a peripheral device and a remote network location.

9. A non-transitory on a computer readable storage medium having stored thereon computer executable instructions configured to cause a computer perform operations to replace a resident executable application on a wireless device with a different version of the application, the operations comprising:
- receiving a request to replace the resident executable application with the different version of the application, wherein the request is initiated in response to a user input and wherein the request to replace the resident executable includes replacing non-essential application components while maintaining non-retrievable application-associated data;
- detecting the active execution of the resident executable application on the wireless device;
- receiving, via a network, the different version of the resident executable application;
- storing the different version of the resident executable application in a temporary location in response to detecting the active execution of the resident executable application;
- terminate terminating only the active execution of the resident executable application;
- selectively deleting one or more application components if it is determined that there are not sufficient resources on a the wireless device;
- overwriting the resident executable application with the different version of the resident executable application stored in the temporary location; and
- initiate initiating active execution of the different version of the resident executable application without rebooting the wireless device wherein activation of the different version of the resident executable application includes using of the maintained non-retrievable application-associated data.

10. The non-transitory computer readable storage medium of claim 9, wherein the resident executable application is at least one of: an extension, a script and content data.

11. A wireless device containing a resident executable application, comprising:
- means for receiving a request to replace the resident executable application with a different version of the application, wherein the request is initiated in response to a user input and wherein the request to replace the resident executable includes replacing non-essential application components while maintaining non-retrievable application-associated data;
- means for detecting the active execution of the resident executable application on the wireless device;
- means for receiving, via a network, the different version of the resident executable application;
- means for storing the different version of the resident executable application in a temporary location in response to detecting the active execution of the resident executable application;
- means for terminating only the active execution of the resident executable application;
- means for selectively deleting one or more application components if it is determined that there are not sufficient resources on a the wireless device;
- means for overwriting the resident executable application with the different version of the resident executable application stored in the temporary location; and
- means for initiating active execution of the different version of the resident executable application without rebooting the wireless device wherein activation of the different version of the resident executable application includes using of the maintained non-retrievable application-associated data.

12. The wireless device of claim 11, wherein the resident executable application is at least one of: an extension, a script and content data.

13. A method for replacing a resident executable application stored in an active application location on a wireless device with a different version of the resident executable application during active execution of the resident executable application, comprising:
- receiving a request to replace the resident executable application with the different version of the resident executable application wherein the request to replace the resident executable includes replacing non-essential application components while maintaining non-retrievable application-associated data;
- receiving, via a network, the different version of the resident executable application;
- storing the different version of the resident executable application in an upgrade location in response to receiving the request to replace the resident executable application with a different version of the resident executable application;
- detecting the active execution of the resident executable application in an active application location on the wireless device;
- terminating only the active execution of the resident executable application; and
- selectively deleting one or more application components if it is determined that there are not sufficient resources on a the wireless device;
- initiating execution of first resident executable application detected in a sequential search of the upgrade location and the active application location without rebooting the wireless device, wherein activation of the different version of the resident executable application includes using of the maintained non-retrievable application-associated data.

14. The method of claim 13, wherein the request is initiated by the wireless device.

15. The method of claim 13, wherein the request is initiated with the detection of user input.

16. The method of claim 13, wherein the different version of the resident executable application is a previous version.

17. The method of claim 13, wherein the resident executable application is at least one of: an extension, a script and content data.

18. The method of claim 13, wherein the temporary location is at least one of: a peripheral device and a remote network location.

19. A wireless device containing a resident executable application stored in an active application location and actively executing thereon, comprising:
- a processor which receives a request to replace the resident executable application with a different version of the resident executable application wherein the request to replace the resident executable includes replacing non-essential application components while maintaining non-retrievable application-associated data;

memory which receives, via a network, the different version of the application and stores the different version of the application in an upgrade location in response to receiving the request to replace the resident executable application with the different version of the resident executable application;

wherein the processor detects the active execution of the resident executable application on the wireless device, terminates only the active execution of the resident executable application, selectively deletes one or more application components if it is determined that there are not sufficient resources on a the wireless device, and initiates execution of first resident executable application detected in a sequential search of the upgrade location and the active application location without rebooting the wireless device, wherein activation of the different version of the resident executable application includes using of the maintained non-retrievable application-associated data.

20. The wireless device of claim 19, wherein the request is initiated by the wireless device.

21. The wireless device of claim 19, wherein the request is initiated with the detection of user input.

22. The wireless device of claim 19, wherein the different version of resident executable application is a previous version.

23. The wireless device of claim 19, wherein the resident executable application is at least one of: an extension, a script and content data.

24. The wireless device of claim 19, wherein the upgrade location is at least one of: a peripheral device and a remote network location.

25. A non-transitory computer readable storage medium having stored thereon computer executable instructions configured to cause a computer perform operations to replace a resident executable application stored in an active application location on a wireless device with a different version of the application during active execution of the application, the operations comprising:

receiving a request to replace the resident executable application with the different version of the resident executable application wherein the request to replace the resident executable includes replacing non-essential application components while maintaining non-retrievable application-associated data;

receiving, via a network, the different version of the resident executable application;

storing the different version of the resident executable application in an upgrade location in response to receiving the request to replace the resident executable application with a different version of the resident executable application;

detecting the active execution of the resident executable application in an active application location on the wireless device;

terminating only the active execution of the resident executable application; and selectively deleting one or more application components if it is determined that there are not sufficient resources on a the wireless device;

initiating execution of first resident executable application detected in a sequential search of the upgrade location and the active application location without rebooting the wireless device wherein activation of the different version of the resident executable application includes using of the maintained non-retrievable application-associated data.

26. The non-transitory computer readable storage medium of claim 25, wherein the resident executable application is at least one of: an extension, a script and content data.

27. A wireless device containing a resident executable application stored in an active application location and actively executing thereon, comprising:

means for receiving a request to replace the resident executable application with a different version of the resident executable application;

wherein the request to replace the resident executable includes replacing non-essential application components while maintaining non-retrievable application-associated data;

means for receiving, via a network, the different version of the resident executable application;

means for storing the different version of the resident executable application in an upgrade location in response to receiving the request to replace the resident executable application with the different version of the resident executable application;

means for detecting the active execution of the resident executable application in an active application location on the wireless device;

means for terminating only the active execution of the resident executable application; and means for selectively deleting one or more application components if it is determined that there are not sufficient resources on a the wireless device;

means for initiating execution of first application detected in a sequential search of the upgrade location and the active application location without rebooting the wireless device wherein activation of the different version of the resident executable application includes using of the maintained non-retrievable application-associated data.

28. The wireless device of claim 27, wherein the resident executable application is at least one of: an extension, a script and content data.

* * * * *